United States Patent [19]

Klenk et al.

[11] 4,339,899

[45] Jul. 20, 1982

[54] ADJUSTABLE CONNECTOR FOR COUPLING TOWER LEG TO FOUNDATION SUPPORT ANCHOR

[75] Inventors: William A. Klenk, Missouri City; Albert B. Atkinson, Houston, both of Tex.; Donald E. Bobbitt, Centralia, Mo.

[73] Assignee: A. B. Chance Company, Centralia, Mo.

[21] Appl. No.: 201,593

[22] Filed: Oct. 28, 1980

[51] Int. Cl.[3] ............................................. E02D 5/74
[52] U.S. Cl. .................................... 52/157; 52/122.1; 52/649; 403/4; 403/337; 405/224
[58] Field of Search ............... 405/224, 225, 226, 227, 405/204, 195; 52/122, 123, 157-165, 40, 649; 403/4, 336, 337; 248/188.2

[56] References Cited

U.S. PATENT DOCUMENTS

| | | | |
|---|---|---|---|
| 1,952,011 | 3/1934 | Jenney | 52/649 X |
| 2,881,591 | 4/1959 | Reeve | 405/224 |
| 3,181,649 | 5/1965 | Cutter | 52/649 X |
| 3,364,636 | 1/1968 | Salsig | 52/122 X |
| 3,528,254 | 9/1970 | Graham | 405/204 |
| 3,546,885 | 12/1970 | Pogonowski | 405/227 |

FOREIGN PATENT DOCUMENTS 1396415  6/1975  United Kingdom ................ 405/224

*Primary Examiner*—Dennis L. Taylor

*Attorney, Agent, or Firm*—Schmidt, Johnson, Hovey & Williams

[57] ABSTRACT

A connector assembly and method are disclosed for supporting each of the legs of a free standing tower or the like using a screw anchor driven into the ground at the base of a respective tower leg. In order to compensate for irregularities in alignment between the upper end of each screw anchor and a corresponding tower leg, the connector units are initially mounted on the screw anchors in a manner permitting individual axial, angular and longitudinal adjustment as may be necessary to bring each connector unit into proper alignment with a tower leg thereabove. The connector units while being held in such aligned disposition may be precisely affixed to a corresponding screw anchor and the proximal tower leg using the connector unit itself as a guide for such interconnection. Temporary adjustable support for the connector units takes the form of a unique removable holding fixture between a screw anchor and the connector unit thereon constructed and arranged to allow vernier adjustment of the connector unit in axial and angular directions relative to the screw anchor to assure that each connector unit may be brought into precise alignment with a tower leg before the connector unit is rigidly coupled to the screw anchor below and the tower leg above. Requisite lateral adjustment is provided in the form of a slidable connection between the connector unit and a base plate adapted to be joined to the tower leg supported thereby.

24 Claims, 18 Drawing Figures

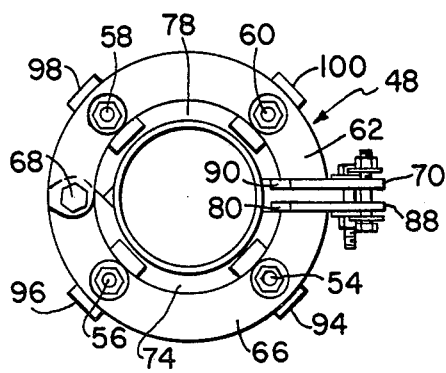
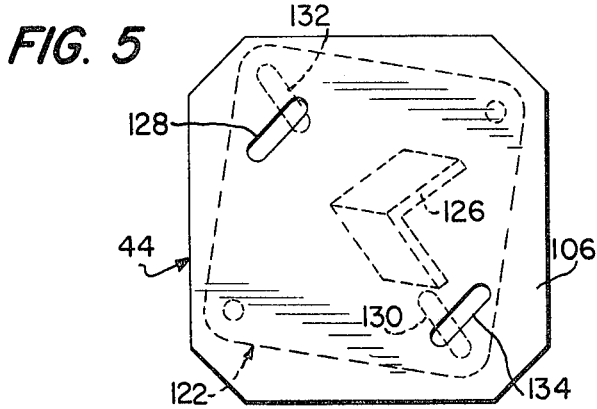
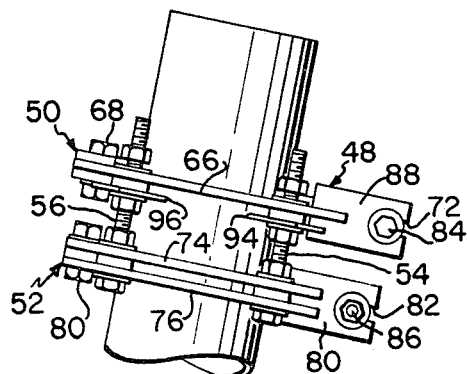
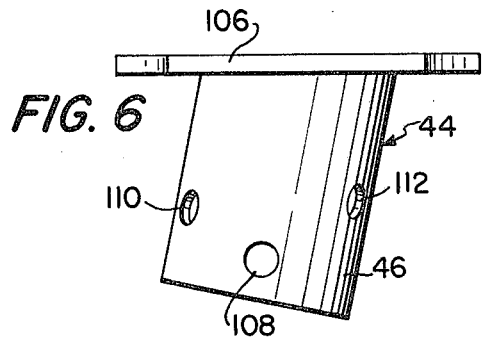
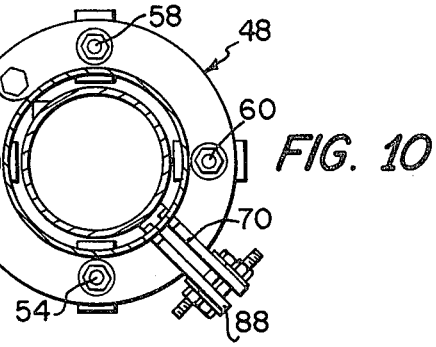
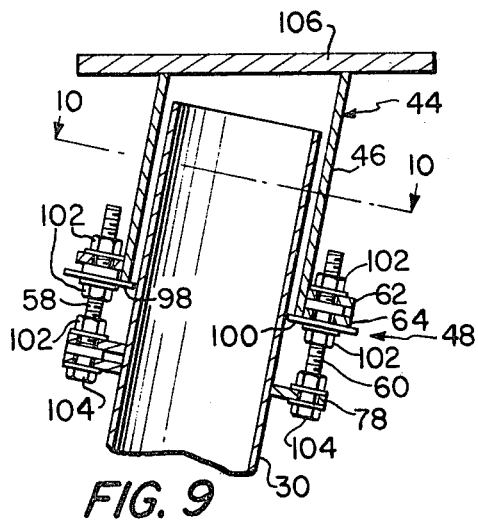
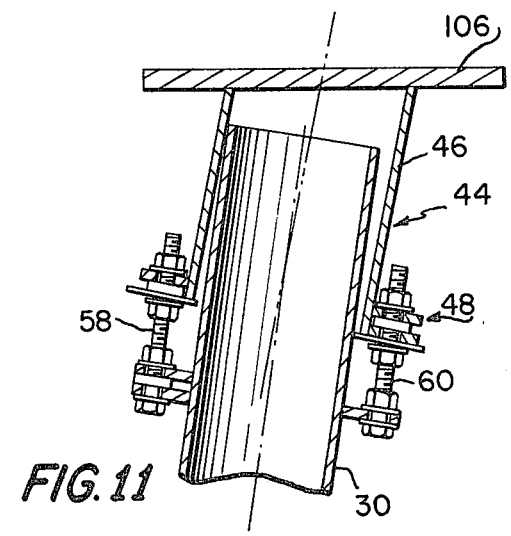

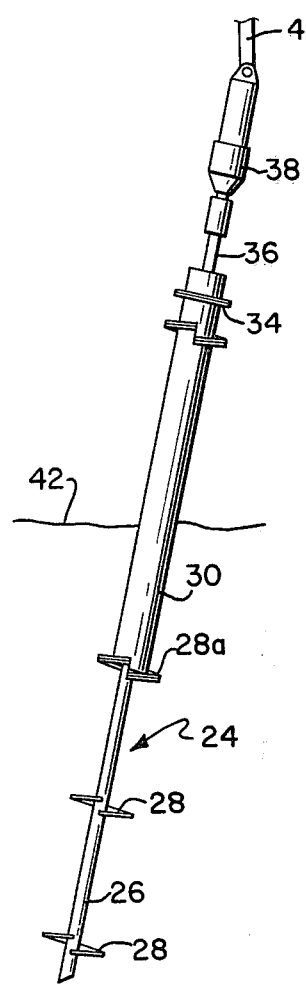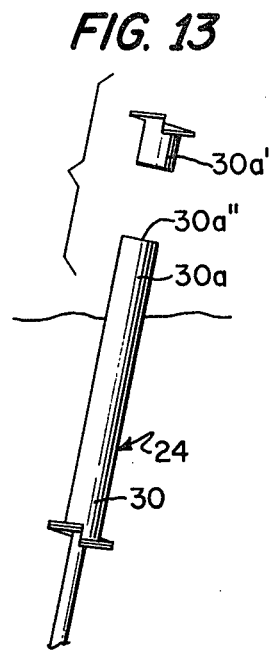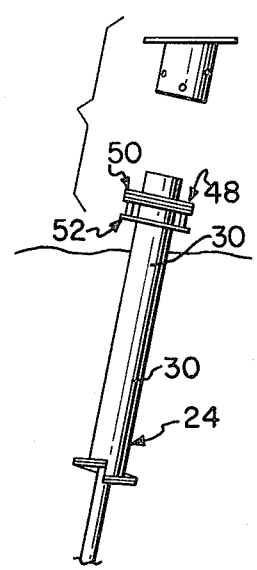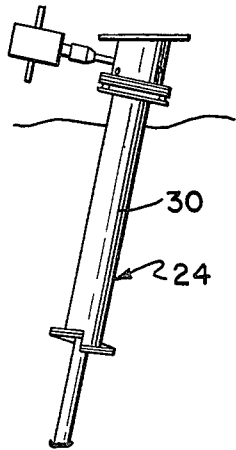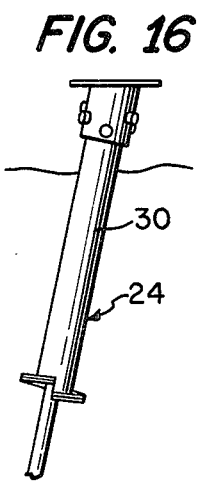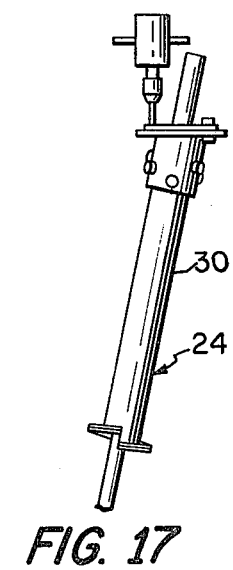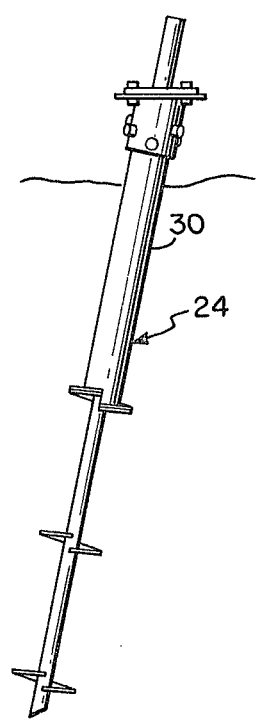

ADJUSTABLE CONNECTOR FOR COUPLING TOWER LEG TO FOUNDATION SUPPORT ANCHOR

TECHNICAL FIELD

This invention relates to foundations for free standing towers such as the lattice work units used to support electrical transmission and distribution conductors and is particularly concerned with a novel screw anchor foundation designed to carry a respective leg of the tower obviating the necessity of constructing concrete base pads and utilizing templates to locate the tower leg anchor fixtures in the concrete as has previously been required.

In particular, the invention relates to a support assembly for each leg of a free standing tower or the like comprising the combination of a screw anchor adapted to be rotatively driven into the ground at a point where a corresponding tower leg is to be supported, a novel connector unit located in adjustable disposition on the upper end of the screw anchor and movable as necessary to bring the same into precise alignment for supporting the tower leg, and means for joining the connector unit to the screw anchor and to the tower leg in fixed relationship thereto whereby a free standing tower may be mounted on and entirely supported by screw anchors located at corresponding corners of the tower.

BACKGROUND ART

Free standing lattice towers have long been used for supporting overhead electrical conductors forming a part of electrical transmission and distribution lines. These towers are relatively inexpensive for the service performed, may be prefabricated and shipped to the site of use for assembly and readily adapt to different terrain conditions. They are made up of standard components cut to size and then for the most part bolted in place at each point where conductor support is dictated by the line design. The towers terminate at the bottom with individual legs that are bolted to a supporting structure therefor which is capable of withstanding both tension, compression and shear loads. Not only does the weight of the tower rest on the leg supports, but tension forces are imposed thereon as winds from varying directions attempt to displace the tower and its load in a direction away from the wind.

In most instances, support for free standing lattice work towers has taken the form of concrete pads poured in place at the four corners of the tower for implacement of the tower legs thereon. Jigs or templates in effect comprising the lowermost bottom section of a tower with members depending therefrom in the same position as the legs of the tower to be fabricated in place are located over the concrete pads prior to setting up of the concrete whereby leg anchors may be embedded in the concrete in required disposition so that upon hardening of the cement, the tower anchors are in precise relative positions for bolting of the tower leg components thereto.

It can be appreciated that this support method for free standing towers can often present construction difficulties not only because of the site of fabrication, but also the necessity of hauling to the tower assembly point means for pouring concrete as well as the jig or tower template required to accurately locate the tower anchors which are embedded into the concrete pads. In remote electrical transmission line sites, the difficulty to transporting cementitious materials to the tower location, building the pads and locating the anchors using a tower jig is a formidable task and substantially increases the cost of the tower construction. Furthermore, in some locations where the ground is of a swampy nature, it is extremely difficult to not only move the materials to the construction area, but equally important, such materials must be moved from tower location to tower location for the next successive installation.

Although it has been suggested that towers may conveniently be supported on screw anchors driven into the ground at each point which is to be a corner of the tower, the procedure has not yet met with commercial success because of the inherent difficulty of driving an anchor into the ground with the required precision that the upper extremity of such anchor is exactly aligned with a respective tower leg for direct bolting of the latter to the anchor shaft or tube. Not only is it impractical to install the screw anchor at an exact required angle with respect to the vertical because of the inability to start such anchor with required accuracy, but equally as important, differences in the stratum of the ground as the anchor is driven into the latter causes deflections of the anchor to one side or the other depending upon the nature of the soil. As a result the upper end of the anchor after completion of the installation thereof, is not necessarily in the precise position required for alignment with a respective tower leg.

It has been suggested in this regard that perhaps the screw anchor foundations can be welded to the tower legs and if necessary intermediate metal shims or connectors may be welded between the screw anchor foundation and the corresponding tower legs to compensate for misalignment of the anchor with the tower leg extension. Although field welding might in many instances solve the problem presented, it is not a satisfactory solution from a construction standpoint because of the difficulty of controlling the quality of the welds under field conditions, the need to transport the necessary welding apparatus to the construction site, the absolute requisite of employing highly skilled welders who can perform quality welding under extremely adverse field conditions, and the reluctance of utilities to support very high voltage electrical conductors on towers where the integrity of the system is dependent on the quality of the welding which has not and cannot be subjected to the same analytical techniques available in shop welding fabrication.

BRIEF DESCRIPTION OF THE INVENTION

This invention traverses the problems of the prior art by totally doing away with the need for constructing concrete pads at the tower site, eliminating the necessity of welding in the field, and allowing a free standing tower such as those of the lattice work type to be supported solely by screw anchors driven into the ground at each corner of the tower. Connection of the tower legs to the screw anchors is solely through bolted connections which may be performed by only reasonably skilled workers and totally eliminating the need to use jigs or templates for precise location of tower leg anchors while at the same time permitting the screw anchors to be driven into the ground with only normal tolerance specifications.

Support of a free standing tower is accomplished by driving a foundation anchor into the ground at each point where a corner of the tower is to be located. A special connector unit is then placed over the upper end of each foundation anchor projecting from the ground, using a novel fixture which clamps to the anchor tube or shaft and has means for adjustably supporting the connector. A tower leg base is carried by the connector unit for direct attachment to the tower leg extension. The fixture which initially supports the connector unit on the screw anchor allows the installer to vary the batter angle of the connector unit relative to the axis of the anchor shaft and to move the connector unit vertically as may be necessary to precisely align the base support with the tower leg extension. In addition, the base may be shifted laterally in all directions to provide the necessary lateral adjustment of the base to bring it into requisite alignment with the tower leg. After the connector unit and the base supported thereby have been adjusted as necessary, then holes in the connector unit are used as pilot guides to drill holes in the anchor shaft or tube so that fastening elements such as through bolts may be passed through aligned holes to fixedly secure the connector unit to the anchor. In similar manner, the base may be securely bolted to the connector unit after proper location of the base with respect to the lower extension of the tower leg associated therewith.

PRINCIPAL OBJECTS OF THE INVENTION

It is therefore one of the principal objects of this invention to provide a complete factory built-factory engineered support assembly for each of the tower legs of a free standing tower such as those of the lattice work type wherein the components are predesigned utilizing modular units as a complete foundation without the need for employing concrete pads or field welding techniques.

Also an important object of the invention is to provide a support assembly for a free standing tower as described wherein the employment of screw anchors allows inherent self discovery of appropriate substratum load bearing capability of soil without prior on-site investigation and a means of mechanically transmitting tension, compression, and shear forces to that soil from the supported tower.

A further important object of the invention is to provide an environmentally preferred means of installing a foundation for remotely located and isolated structures by virtue of the elimination of the need for preparing access roads or use of auxiliary supporting construction materials which lead to hazardous wastes and the like. In like manner, the support assembly and method of installation minimizes impact on environmentally sensative areas such as tundras, wetlands and the like.

Further important objects of the invention include the provision of means by which a self-supporting structure such as a tower for electrical transmission and distribution lines can be installed immediately without construction delays for emergency by-pass of utility lines and/or economics of project scheduling and construction; overall energy-saving construction techniques are available wherein use of skilled labor and numbers of labor skills are minimized; emergency replacements for storm and natural-force damaged structures may be expedited and allowing pre-engineered and factory designed, manufactured and tested components which can be stocked for immediate sale and use either as complete units or replaceable parts.

Another important object of the invention is to provide a support assembly for each leg of a self-supporting tower which allows horizontal, vertical and angular field adjustments for precise alignment of a corresponding tower leg extension with the screw anchor support therefor and wherein a reusable fixture is available providing vernier adjustment and positioning of an interconnection device between the tower leg and screw anchor providing precise fit of bolt holes between a base shoe and the tower leg permitting all necessary bolts to be easily installed in a minimum of time, without special equipment and ordinary skill. A further important object of the invention is to provide a support assembly for each leg of a self-supporting structure which provides smooth and flexible redistribution of the stresses of tension, compression and shear in the tower legs directly into the foundation in a controlled, predetermined manner without over stressing either the structure or the foundation and wherein the structural capability of the foundation may be verified simultaneously with installation of the tower.

A still further important object of the invention is to provide a method of providing an infinitely adjustable size foundation for the legs of a self-supported structure as required for local soil conditions and/or unpredictable varieties of sub-soils. In like manner, an object is to provide a method of construction of the foundation support assembly for a self-supporting structure which permits complete, uninterrupted construction and erection of the tower without need for separately testing or verifying the installed structural capacity of the foundation.

Also an important object of the invention is to provide a method of installing a foundation assembly for self-supporting structures combined with module selection for locating the load carrying elements of the foundation in appropriate soil substrata for best utilization of structural elements and maximum economy of construction.

BRIEF DESCRIPTION OF DRAWINGS

FIG. 5 is a plan view similar to FIG. 3 and showing in essentially schematic form the way in which the upper base may be shifted relative to the underlying connector unit for adjustment purposes as required for a particular installation;

FIG. 6 is a side elevational view of the connector unit adapted to be telescoped over the upper end of a screw anchor installed in the ground;

FIG. 7 is a plan view of the novel holding fixture of the present invention used to temporarily support the connector unit on the upper end of a screw anchor and allowing infinite variation of the elevation of the connector unit and the batter angle thereof relative to the screw anchor until such time as the connector unit may be permanently affixed to the screw anchor;

FIG. 9 is a vertical cross-sectional view in fragmentary form showing the way in which the connector unit is adjustably mounted on the upper end of the screw anchor prior to permanent affixation of the connector unit to the anchor;

FIG. 10 is a horizontal cross-sectional view taken on the line 10—10 of FIG. 9 and looking downwardly in the direction of the arrows;

FIG. 11 is a vertical cross-sectional view similar to FIG. 9 but showing the way in which the connector unit may be angularly adjusted relative to the screw anchor through use of the removable holding fixture supporting the connector unit on the screw anchor; and FIGS. 12-18 inclusive are schematic depictions of the normal installation steps wherein;
  (a) FIG. 12 illustrates the initial step of power installation of the screw anchor foundation,
  (b) FIG. 13 illustrates the manner in which the upper end of the foundation may be cut off to a desired height,
  (c) FIG. 14 illustrates the step of installation of the holding fixture on the upper end of the screw anchor through use of the fixture as a support therefor,
  (d) FIG. 15 is a schematic representation of the way in which pre-drilled holes in the connector unit serve as pilot guides for drilling of aligned holes in the screw anchor after the connector unit has been properly adjusted relative to the tower leg to be supported,
  (e) FIG. 16 depicts the way in which through bolts are used to permanently affix the connector unit to the screw anchor,
  (f) FIG. 17 shows the way in which the base may be bolted to the connector unit in proper relationship thereon for supporting the respective tower leg, and
  (g) FIG. 18 represents schematically the final assembly ready for joinder of a tower leg thereto in supporting relationship to the latter.

BEST MODE OF CARRYING OUT THE INVENTION

Figure 1:
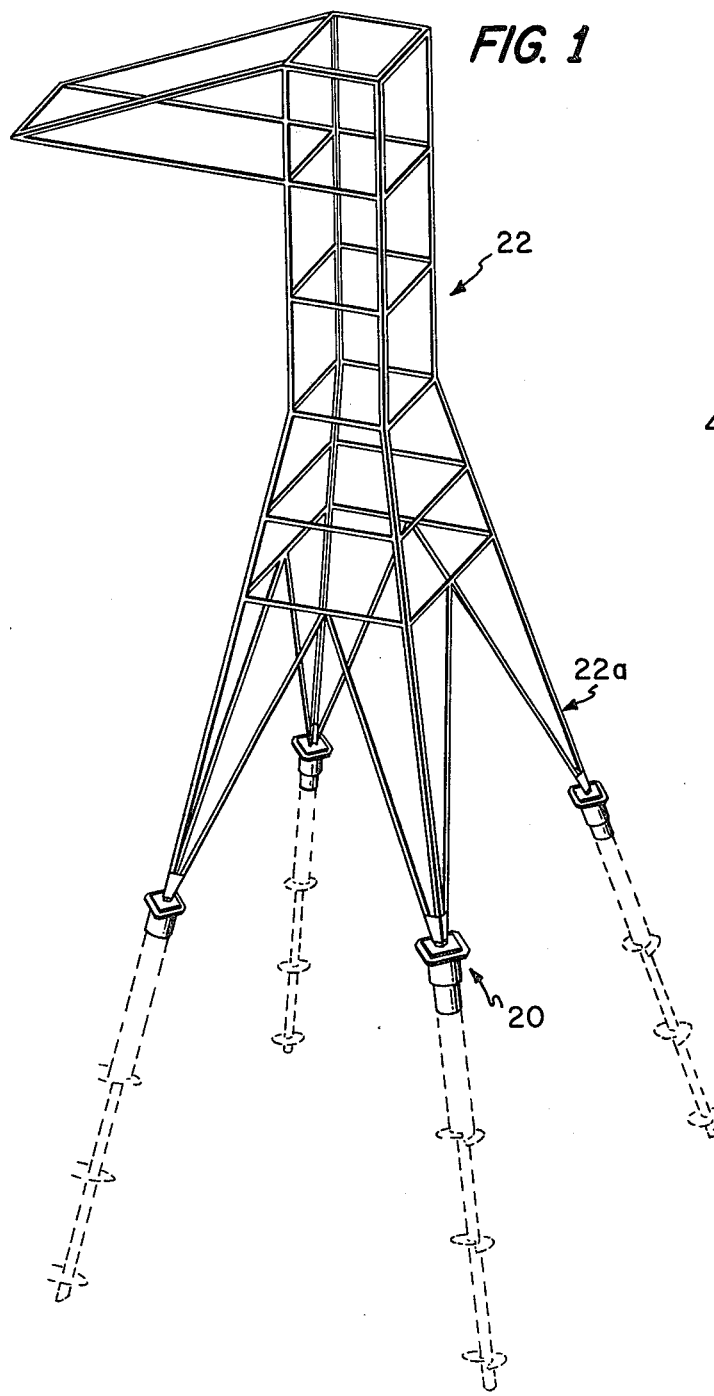
FIG. 1 is an essentially schematic representation of a self-supporting tower carried by an improved foundation constructed in accordance with the preferred concepts of this invention and involving a screw anchor support assembly for each tower leg.
Figure 2:
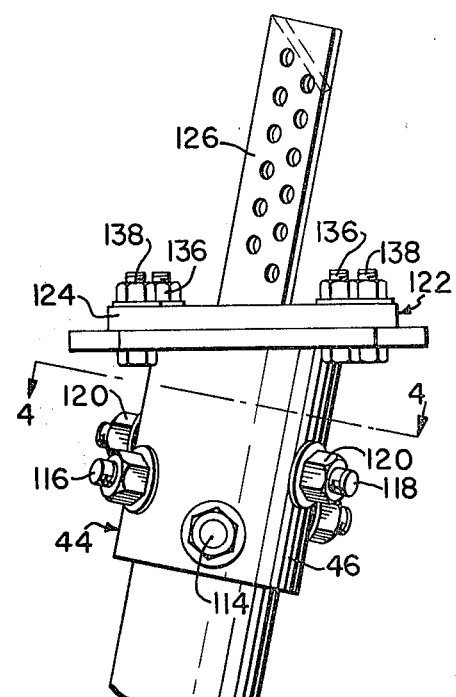
FIG. 2 is an enlarged, fragmentary side elevational view of a support assembly for a tower leg.
Figure 4:
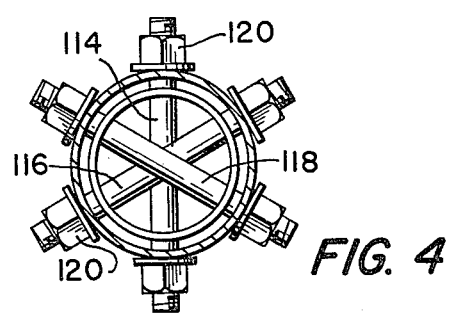
FIG. 4 is a horizontal cross-sectional view taken substantially on the line 4—4 of FIG. 2 and looking the direction of the arrows.
Figure 3:
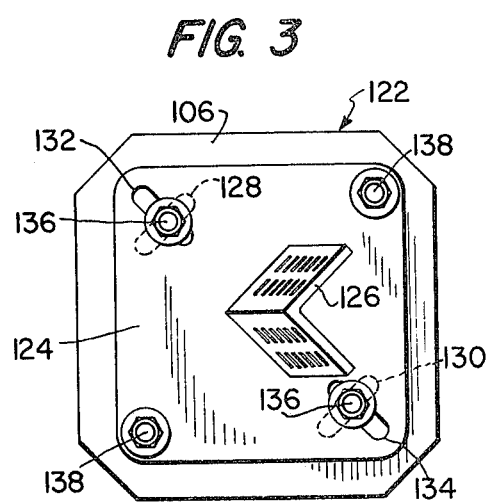
FIG. 3 is a plan view of the assembly depicted in FIG. 2.

The support assembly 20 services as a foundation for respective corners of an upright structure such as a lattice type tower 22 used for example to support overhead conductors forming a part of electrical transmission and distribution lines. It is to be understood in this respect though that the tower 22 is shown for illustrative purposes only and the foundation of this invention may be used to support a variety of different structures where tension, compression and shear forces are imposed on the underlying base.

The foundation is made up in part by a screw anchor 24 (FIGS. 12-18 inclusive) having a pointed shaft 26 mounting a series of helices 28 spaced along the length of the shaft. A hollow tubular member 30 joined to the upper helix 28a is of tubular configuration and has a coupling flange 34 at the upper extremity thereof adapted to be joined to the kelly bar 36 of a hydraulically driven motor 38 pivotally supported from a link 40 suspended from the boom of a utility vehicle of conventional construction. The boom is of such nature that it may be raised and lowered as well as swung about the mounting point thereof, so that screw anchor 24 may be driven into the ground 42 at a specific point and at a preselected angle with respect to the horizontal surface of ground 42.

As illustrated in FIG. 13 and more particularly described hereinafter, the tubular member 30 of screw anchor 24 is adapted to be cut off at the upper end thereof at a predetermined elevation above ground level permitting connector unit broadly designated 44 (FIG. 6) to be mounted thereon.

It is preferred that the connector unit 44 be telescoped over the upper end 30a of tubular member 30 and in a typical design, the cylindrical section 46 may for instance be the diameter of a typical 10 inch metal pipe while cylindrical component or member 30 of anchor 24 is desirably of a diameter approximating that of an 8 inch metal pipe. In this manner, the angularity of the axis of cylindrical section 46 may be altered within limits of about 3° relative to the axis of anchor 24 when connector unit 44 is mounted on the upper end 30a of cylindrical member 30.

Viewing FIGS. 7-11 and 14, a novel holding fixture broadly designated 48 is temporarily mounted on the cylindrical member 30 of screw anchor 24 for supporting connector unit 44 thereon until the position of the unit 44 has been accurately established whereupon a permanent connection of unit 44 to screw anchor 24 may be effected.

Holding fixture 48 has upper and lower ring members 50 and 52 which are separated by four adjustment screws 54, 56, 58 and 60. The upper ring member 50 has two semicircular plates 62 and 64 which are joined to a single semicircular plate 66 by a bolt 68 between adjacent ends thereof permitting plates 62 and 64 to be rotated as a unit relative to the semicircular plate 66. The ends of plates 62 and 64 opposite pivot bolt 68 are welded to an upright connector 70 provided with a slot 72 in the outer end thereof which extends inwardly toward plates 62 and 64.

In like manner, the lower ring member 52 has a pair of split ring plates 74 and 76 in overlying, spaced relationship which are joined to a single split ring plate 78 therebetween through the medium of bolt means 80. As is most apparent from FIGS. 8 and 9, the plates 62 and 64 are on one side of the annulus presented by such plates and the associated plate 66 while the plate 74 and 76 are on the opposite side of the circles presented thereby. Another connector 80 similar to the connector 70 is joined to the ends of plates 74 and 76 away from bolt 80 and is provided with a slot 82 therein. In like manner, the extremities of single plates 66 and 78 have connectors 88 and 90 on the outer extremities thereof in disposition for alignment with opposed corresponding connectors 70 and 80. Connectors 88 and 90 also have slots therein respectively which align with slots 72 and 82.

As is most evident from FIGS. 7 and 10, the upper split ring member 50 is of greater diameter than that of lower split ring member 52 to accommodate the difference in diameter between the cylindrical section 46 of connector unit 44 and that of tubular component or member 30 of screw anchor 24. Furthermore, holding tabs 94 and 96 mounted on screws 54 and 56 beneath single plate 66 of ring member 50 and tabs 98 and 100 mounted on screws 58 and 60 between plates 62 and 64 of split ring member 50 project into the opening of the ring member when the latter is closed to serve as a support for the connector unit 44 as the lower edge of cylindrical section 46 rests on the inner extremities of such tabs (see FIG. 9). A series of nuts 102 are provided on each of the screws 54–60 as illustrated in FIGS. 8 and 9 which serve to fix ring member 50 relative to ring member 52 in desired relative spatial and angular relationship. It is to be observed that by loosening corresponding nuts 102 on the screws, the latter may be rotated through the hex heads 104 thereon to raise or lower that corresponding part of the ring member 50 thereabove whereupon the nuts may be tightened to fix the relative positions between split ring members 50 and 52.

The split ring members 50 and 52 also allow clamping of the member 52 to circular member 30 of anchor 24 through the medium of bolt 86 while ring member 52 is clamped to cylindrical section 46 of connector unit 44 through the means of bolt 84.

Connector unit 44 has a foundation cap plate 106 integral with the upper end of cylindrical section 46 and as shown in FIG. 6, it is desirable that the plate 106 be located at an angle other than 90° with respect to the axis of cylindrical section 46. This presupposes that the foundation will be used for supporting a tower 22 wherein the legs are at an angle with respect to the vertical. In those instances where the support assembly 20 is used to carry a tower wherein the legs are vertical, then the cap plate 106 will be located at right angles with respect to the axis of cylindrical section 46.

Cylindrical section 46 is also desirably provided with three pairs of holes therethrough with each pair being aligned radially of the cylindrical component. One pair of holes 108 are proximal to the lower edge of the cylindrical section 46, an intermediate pair of holes 110 are 120° therefrom, while the uppermost holes 112 are also 120° out of phase of the remaining holes. The holes 108, 110 and 112 serve as means for receiving a series of through bolts 114, 116 and 118 respectively which in preferred usage are of the order of 1¾ inch in diameter and adapted to receive securing nuts 120 on the outer ends thereof. As will be explained hereinafter, these through bolts 114-118 also extend through corresponding holes therefor in tubular member 30 of screw anchor 24.

A shoe base broadly designated 122 is adjustably mounted on cap plate 106 of connector unit 44 and includes a shoe base plate 124 laying flat against the cap plate 106. For exemplary purposes only, an apertured extension 126 is shown as being welded to the upper face of plate 124 and at an angle relative thereto such that it is coaxial with the axis of cylindrical section 46 of connector unit 44 but it is to be appreciated that the extension 126 may take many forms suitable for direct connection to the corresponding leg structure of tower 22. The configuration of extension 126 and the bolt holes provided therein will vary from job to job and be dictated by the tower manufacturer.

In any event, it is desirable that the shoe base 122 be laterally adjustable with respect to connector unit 44 and to this end, cap plate 106 has two elongated parallel cross-slots 128 and 130 at opposite corners thereof which mate with aligned, elongated slots 132 and 134 respectively in shoe base plate 124. Bolts extending through each of the aligned slots 128 and 132 as well as 130 and 134 are designated by the numeral 136 and allow selective clamping of shoe base 122 to the connector unit 44.

Once the relative position of shoe base 122 with respect to connector unit 44 has been determined, it is desirable that additional threaded fasteners in the nature of bolts 138 be used to interconnect plate 124 with plate 106 at the corners thereof opposite bolts 136.

INDUSTRIAL APPLICABILITY

In the installation of the support assembly 20, the screw anchor 24 is driven into the ground at a requisite angle determined by the angularity of the legs 22a of the tower 22 or other structure to be carried thereby, with the screw installation being governed by the locations of the corner points of the tower unit. The depth to which the screw anchor is driven is a function of the load thereon, the soil conditions encountered and the size of the screw anchor itself. Thus, it is to be understood that the screw anchor depicted in FIG. 12 of the drawing is for exemplary purposes only and is not intended to be a limitation on the type of anchor, the configuration of the same, or the effective length. In fact, in certain marsh or swamp areas, it is generally necessary to attach a number of extensions to the anchor in order to drive the helix portion thereof down into firm load bearing soil.

After the screw anchor 24 has been installed in proper angular disposition with respect to ground level, the top part 30a' may be cut off as schematically illustrated in FIG. 13 so that the top edge 30a" of cylindrical member 30 is at a desired elevation above the ground surface.

Next, the holding fixture 48 is placed around the upper extremity 30a of screw anchor 24 with the split ring members 50 and 52 surrounding the tubular component and clamped to the latter by taking up of bolt 86 to force the connectors 80 and 90 toward each other until the inner edges of plates 74-78 firmly grip the outer surface of the tubular member 30 of screw anchor 24.

Connector unit 44 is then telescoped over the upper end 30a of cylindrical member 30 of screw anchor 24 with the lower edge of section 46 resting on and supported by the tabs 94-100 forming a part of ring member 50. The inner edges of plates 62-64 complementally engage the outer cylindrical surface of section 46 to co-axially align the latter with tubular member 30 of screw anchor 24. Take up of bolt 84 until the inner edges of the plates of ring member 50 engage the surface of cylindrical section 46 of connector unit 44 assure proper axial alignment of the parts by virtue of the fact that the ring members 50 and 52 are interconnected by the four adjusting screws 54-60.

The installation crew next uses a level resting on cap plate 106 of connector unit 44 to level the latter using adjusting screws 54-60 for this purpose. Similarly, a surveying transit is advantageously employed to determine the height of the cap plate 106 above the ground or a fixed elevational point and here again the adjusting screws 54-60 may be rotated as necessary to increase or decrease the height of connector unit 44 with respect to screw anchor 24.

Directing attention to FIG. 11, it can be seen that the adjusting screws 54-60 may be individually rotated as necessary to change the batter angle of connector unit 44 relative to the axis of tubular member 30 of screw anchor 24 and at least a 3° angular difference is possible if the tubular member 30 and cylindrical section 46 are of different relative diameters as illustrated and of the magnitude previously suggested (8 inches vs 10 inches).

Once the elevation and angularity of connector unit 44 have been accurately established, the holes 108, 110 and 112 may be used as pilot guides for drilling corresponding aligned openings in tubular member 30 of screw anchor 24 as shown schematically in FIG. 15. Thereafter, the securing means in the nature of through bolts 114–118 may be used to firmly affix connector unit 44 to screw unit 24 by inserting such bolts through respective aligned openings 114, 116 and 118 in cylindrical section 46 of connector unit 44 as well as the openings which have just been drilled in the upper end 30a of tubular member 30 of screw anchor 24. The nuts 120 are then threaded over opposite ends of the through bolts to securely attach the connector unit 44 to the screw anchor 24. Of particular note is the fact that drilling of the holes in the screw anchor is accomplished while the connector unit 44 is held in required disposition on the upper end of the anchor 24. Once the holes have been bored in tubular member 30, the holding fixture 48 may be removed if desired and the connector unit held in position while the bolts 114–118 are inserted and secured with nuts 120.

The final step in the foundation installation involves positioning of shoe base 122 on cap plate 106 of connector unit 46 and shifting of the base laterally in any desired direction to bring the extension 126 or other equivalent structure into required disposition relative to the remaining foundation extensions. The proper location of shoe base 122 may be readily determined by measuring from a predetermined point either comprising another adjacent foundation extension, or a predetermined point on the ground. Another method of precisely locating the shoe base 122 involves utilization of the surveying method previously referenced utilizing standard engineering triangulation.

Loose mounting of the bolts 136 in respective clearance slots therefor allows the shoe base 122 to be shifted laterally in all directions as required while holding such shoe base in a selected position until such time as the bolts may be tightened down to firmly affix the base to the connector unit 44. Thereupon, the plates 106 and 124 may be suitable drilled for receipt of the final fasteners 138 to firmly affix shoe base 122 to connector unit 44.

One feature of the present invention is the fact that only a limited number of holding fixtures 48 are required in that they may be used on different job sites and in fact only one holding fixture is necessary to carry out multiple foundation installation operations.

Having thus described the invention, what is claimed as new and desired to be secured by Letters Patent is:

1. A support assembly for a tower leg comprising:
   a screw anchor adapted to be rotatively driven into the ground at a preselected location and having an upper support extremity;
   a connector unit located in adjustable disposition relative to the screw anchor before being fixedly secured thereto;
   coupling means for joining the connector unit to the tower leg for support of the latter by the screw anchor; and
   means for fixedly securing the connector unit to the support extremity of the screw anchor after the connector means has been moved into disposition bringing the connector unit into required aligned, supporting relationship to the leg.

2. A support assembly as set forth in claim 1 wherein the connector unit is positioned in telescoped relationship to said support extremity of the screw anchor.

3. A support assembly as set forth in claim 2 wherein said connector unit is spaced from the support extremity of the screw anchor a sufficient distance to allow the connector unit to be shifted axially of the screw anchor, rotated relative thereto and tilted within respect to said axis of the screw anchor before affixation of the connector unit to said anchor in selected disposition as necessary to cause the connector unit to be located in said aligned, supporting relationship to the tower leg.

4. A support assembly as set forth in claim 3 wherein said coupling means comprises cross elements extending transversely of the support extremity of the screw anchor and joined to the connector unit.

5. A support assembly as set forth in claim 4 wherein is provided a plurality of said cross elements located with the axes thereof in non-parallel relationship.

6. A support assembly as set forth in claim 5 wherein is provided three cross elements spaced along the length of the support extremity of the screw anchor and located with the axes thereof in approximately 120° relative angular relationship.

7. A support assembly as set forth in claim 1 wherein said support extremity of the screw anchor is a cylindrical member, said connector unit has a cylindrical section located in spaced, telescoped relationship to the cylindrical member of the screw anchor and the securing means comprises elements fixedly joining the cylindrical section to the anchor member in predetermined disposition along the length of said member, at a required angle with respect to the axis of the member and in a selected rotational position thereon.

8. A support assembly as set forth in claim 7 wherein said section is provided with at least two pairs of axially aligned holes therein, said holes serving as pilot means for drilling of aligned holes in the connector sections to receive securing elements which are passed therethrough after the connector unit has been placed in a requisite position with respect to the screw anchor member for joining the tower leg to the screw anchor.

9. A support assembly as set forth in claim 7 wherein said connector unit is provided with a cap plate thereon located transversely of the cylindrical section above the screw anchor member, said coupling means including a base plate located on and supporting by the cap plate, and extension means on the base plate for connecting the tower leg thereto, said plates being provided with interengageable means for fixedly securing the base plate to the cap plate in any one of a number of different positions to facilitate alignment of the extension means with the tower leg.

10. A support assembly as set forth in claim 9 wherein said interengageable means includes fasteners extending through both of said plates and the latter are provided with slots therein allowing lateral adjustment of the plates one with respect to the other before firm affixation of the base plate to the cap plate.

11. A support assembly as set forth in claim 10 wherein each of the plates is provided with a pair of said slots therein, each slot in one plate being aligned with a corresponding slot in the other plate, each pair of aligned slots in the plates being at essentially right angles to one another.

12. A support assembly as set forth in claim 1 wherein is provided a removable holding fixture for supporting the connector unit in said adjusted disposition thereof on the screw anchor until the connector unit can be rigidly affixed to the screw anchor with said securing means.

13. A support assembly as set forth in claim 12 wherein said holding fixture includes a base member removably mounted on said upper support extremity of the screw anchor, and adjustable means joined to the connector unit and the base member respectively allowing selective variation of the relative spatial relationship between the connector unit and the screw anchor.

14. A support assembly as set forth in claim 13 wherein said holding fixture adjustment means includes a guide member releasably coupled to the connector unit, and vernier adjustment mechanism between the base member and the guide member for varying said spatial and the axial relationship between the connector unit and the screw anchor.

15. A support assembly as set forth in claim 14 wherein said adjustment mechanism includes a plurality of individually rotatable screws between the members for changing the spatial and angular relationship therebetween upon individual rotation of a respective screw.

16. A support assembly as set forth in claim 12 wherein said upper support extremity of the screw anchor and the connector unit are of tubular configuration and located in telescoped relationship, said holding fixture having members of generally annular shape which are releasably clamped to the screw anchor and said connector unit respectively, and selectively adjustable screw means between the members for changing the spatial and angular relationship therebetween.

17. A support assembly as set forth in claim 16 wherein said members are of split ring configuration to allow ready mounting and removal thereof.

18. A support assembly as set forth in claim 16 wherein said securing means comprises a series of through bolts for joining the connector unit and the screw anchor, one of the latter being provided with pre-drilled bolt receiving openings while respective bolt holes for the other are drilled after prepositioning of the connector unit relative to the screw anchor by said holding fixture.

19. A method of providing support for a tower leg including the steps of:
  driving a screw anchor into the ground at the point of support for the tower leg and at a preselected angle relative to the ground surface;
  placing a tower leg connector unit on the upper support extremity of the screw anchor;
  adjusting the position of the connector unit on the screw anchor as necessary to properly align the latter with the tower leg and compensate for differences in orientation and alignment of the tower leg and said screw anchor; and
  holding the connector unit in the desired adjusted position thereof on the screw anchor until the connector unit has been firmly affixed to the screw anchor.

20. A method as set forth in claim 19 wherein is included the step of effecting firm joinder of the connector unit to the screw anchor using the disposition of the connector unit relative to the screw anchor as a guide for such joinder.

21. A method as set forth in claim 19 wherein is included the step of positioning the connector unit and said screw anchor in relative telescoped relationship and adjusting the batter angle between the connector unit and said screw anchor to align the longitudinal length of the tower leg with the axis of the screw anchor before the connector unit is firmly affixed to the screw anchor.

22. A method as set forth in claim 19 wherein is included the steps of providing an infinite range of adjustments of the connector unit relative to the screw anchor within limits in a direction laterally of the axis of the screw anchor, longitudinally of such axis and to alter the batter angle therebetween.

23. A method as set forth in claim 19 wherein the step of adjusting the position of the connector unit relative to the screw anchor includes the steps of mounting a holding fixture on the screw anchor having a guide support for the connector unit, and varying the spatial and angular disposition of the guide support relative to the screw anchor as required to bring the connector unit into necessary spatial and angular orientation with respect to the tower leg while the screw anchor remains stationary.

24. A method as set forth in claim 19 wherein is included the steps of providing pre-drilled through fastener openings in one or the other of said screw anchor or connector unit, drilling through fastener openings in the other of the screw anchor or connector unit in alignment with the pre-drilled openings using the latter as pilot holes, and passing fasteners through aligned holes to firmly affix the connector unit to the screw anchor.

* * * * *